United States Patent [19]
Schenk et al.

[11] Patent Number: 5,823,606
[45] Date of Patent: Oct. 20, 1998

[54] HARD-TOP VEHICLE

[75] Inventors: Bernhard Schenk, Boeblingen; Holger Seel, Aidlingen; Wolfgang Fussnegger, Tuebingen; Kurt Schaible, Aidlingen; Roland Tegeler, Nussdorf, all of Germany

[73] Assignee: Mercedes-Benz AG, Germany

[21] Appl. No.: 577,515

[22] Filed: Dec. 22, 1995

[30] Foreign Application Priority Data

Dec. 22, 1994 [DE] Germany ................. 44 45 944.0

[51] Int. Cl.$^6$ ....................................... B60J 7/20
[52] U.S. Cl. ................. 296/107.08; 296/76; 296/136
[58] Field of Search .............. 296/76, 136; 49/192, 49/193

[56] References Cited

U.S. PATENT DOCUMENTS

| | | | |
|---|---|---|---|
| 1,774,199 | 8/1930 | Good | 296/76 |
| 1,933,623 | 11/1933 | Gordon | 296/76 |
| 2,024,049 | 12/1935 | Mahon | 296/76 |
| 2,552,898 | 5/1951 | Lenci et al. | 296/76 X |
| 2,782,070 | 2/1957 | Chaban | 296/76 |
| 2,939,742 | 6/1960 | Dardarian et al. | 296/107 |
| 3,157,429 | 11/1964 | Harms et al. | 296/76 |
| 3,473,842 | 10/1969 | Bracey et al. | 296/116 |
| 5,551,743 | 9/1996 | Klein et al. | 296/76 |
| 5,649,733 | 7/1997 | Seel et al. | 296/136 X |
| 5,654,615 | 8/1997 | Brodsky | 318/282 |

FOREIGN PATENT DOCUMENTS

| | | |
|---|---|---|
| 44 37 571 | 4/1995 | Germany . |
| 4-53292 | 12/1992 | Japan . |
| 6-1459 | 1/1994 | Japan . |

*Primary Examiner*—Dennis H. Pedder
*Attorney, Agent, or Firm*—Evenson, McKeown, Edwards & Lenahan, P.L.L.C.

[57] ABSTRACT

A hard-top vehicle is provided with a roof structure which includes at least one roof part and a rear-window part and which can be pivoted, via a positive-control device supported such that it is fixed to the bodywork, from a closed position in which it bears in the region of the front windscreen frame and covers the rear-passenger-compartment region into an open position, towards the tail-end region of the vehicle. In the open position, the roof structure can be lowered into a folding-top compartment in the region of a tail gate supported via a pivot pin. The tail gate is articulated via its pivot pin, on an auxiliary frame. For its part, the auxiliary frame is supported, via a pivot pin, on the bodywork in the lower vehicle end region.

11 Claims, 10 Drawing Sheets

HARD-TOP VEHICLE

BACKGROUND AND SUMMARY OF THE INVENTION

The invention relates to a hard-top vehicle having a roof structure including at least one roof part and a rear-window part. The roof structure can be pivoted, via a positive-control device supported such that it is fixed to the bodywork, from a closed position in which it bears in the region of a front windscreen frame and covers the rear-passenger compartment region, into an open position towards the tail-end region of the vehicle. The roof structure can be lowered into a folding-top compartment in the region of a tail gate supported via a pivot pin.

A known hard-top vehicle of the above-mentioned type is described in U.S. Pat. No. 2,939,742, in which the roof structure, which includes the roof part and the rear-window part, is moved, via a positive-control device, towards the tail-end region of the vehicle. This is done in order to open the rear-passenger-compartment region. The roof structure is stowed in a folding-top compartment in the tail-end region of the vehicle. In this known arrangement, the folding-top compartment is closed via a gate which is pivoted, about a tail-end pivot pin, into an open position and is then pivoted back into a closed position. The movability of the gate is restricted to the pivot movement which permits a relatively small opening angle and thus restricts the accessibility in the tail-end region of the vehicle as a whole.

There is therefore needed a hard-top vehicle having a tail gate which permits, with a low degree of technical outlay and with simple operability, both an increase in the opening angle which releases the folding-top compartment and improved accessibility to the tail-end region of the vehicle.

These needs are met according to the present invention by a hard-top vehicle having a roof structure which includes at least one roof part and a rear-window part. The roof structure can be pivoted, via a positive-control device supported such that it is fixed to the bodywork, from a closed position in which it bears in the region of a front windscreen frame and covers the rear-passenger compartment region, into an open position towards the tail-end region of the vehicle. The roof structure can be lowered into a folding-top compartment in the region of a tail gate supported via a pivot pin. The tail gate is articulated, by means of its pivot pin, on an auxiliary frame. For its part, the auxiliary frame is supported, via a pivot pin, on the bodywork in the lower vehicle end region. The tail gate can be pivoted, on the one hand, with movement about its pivot pin into a first open position, in which it opens a trunk towards the rear and, on the other hand, with movement about the second pivot pin together with the auxiliary frame, into a second opening position, in which it releases the folding-top compartment and the trunk upwards.

With the auxiliary frame which supports the tail gate on the bodywork, the hard-top vehicle according to the present invention exhibits a component arrangement which, with a low degree of technical outlay, can be integrated into the vehicle bodywork. With the component arrangement, on the one hand, it is possible to pivot the tail gate into a first open position, in which it improves the accessibility in the region of a vehicle trunk. On the other hand, via a common pivot movement of the auxiliary frame and of the tail gate, it is possible to increase the opening angle for the release of the folding-top compartment so that the two roof parts can be pivoted in or back without obstruction.

In this arrangement, the tail gate, which is of a low overall weight, is pivoted up, for access for use of the vehicle trunk, into a region above the rear-window part of the roof structure. This is done such that a large amount of head clearance is provided for the user and unintended channelling of liquid, e.g. rain water, into the tail-end interior of the vehicle is reliably avoided. In this arrangement, the tail gate, which has a favorable center of gravity position during the pivot movement, is advantageously supported in the region of its pivot pin on the auxiliary frame via a guide linkage. This is done such that an essentially vertical lift is imparted to the tail gate in a first movement phase. As a result, thereafter, the further pivot movement towards the region of the rear-window part can take place with sufficient movement clearance.

When the tail gate and auxiliary frame are pivoted together in order to open the folding-top compartment, movement about the auxiliary-frame pivot pin fixed to the bodywork takes place such that a large opening angle is achieved in the tail-end region of the vehicle. The tail gate projects to a small extent at the tail end. Those parts of the roof structure which can be moved in the tail-end region of the vehicle can, with sufficient movement clearance, be lowered into the region of the folding-top compartment and/or moved out of the same. When the tail gate and auxiliary frame are pivoted together, moreover, the auxiliary frame is moved out of the region of the folding-top compartment. This can achieve, overall, a greater opening width for the introduction of the roof structure.

Other objects, advantages and novel features of the present invention will become apparent from the following detailed description of the invention when considered in conjunction with the accompanying drawings.

DETAILED DESCRIPTION OF THE DRAWINGS

Figure 1:
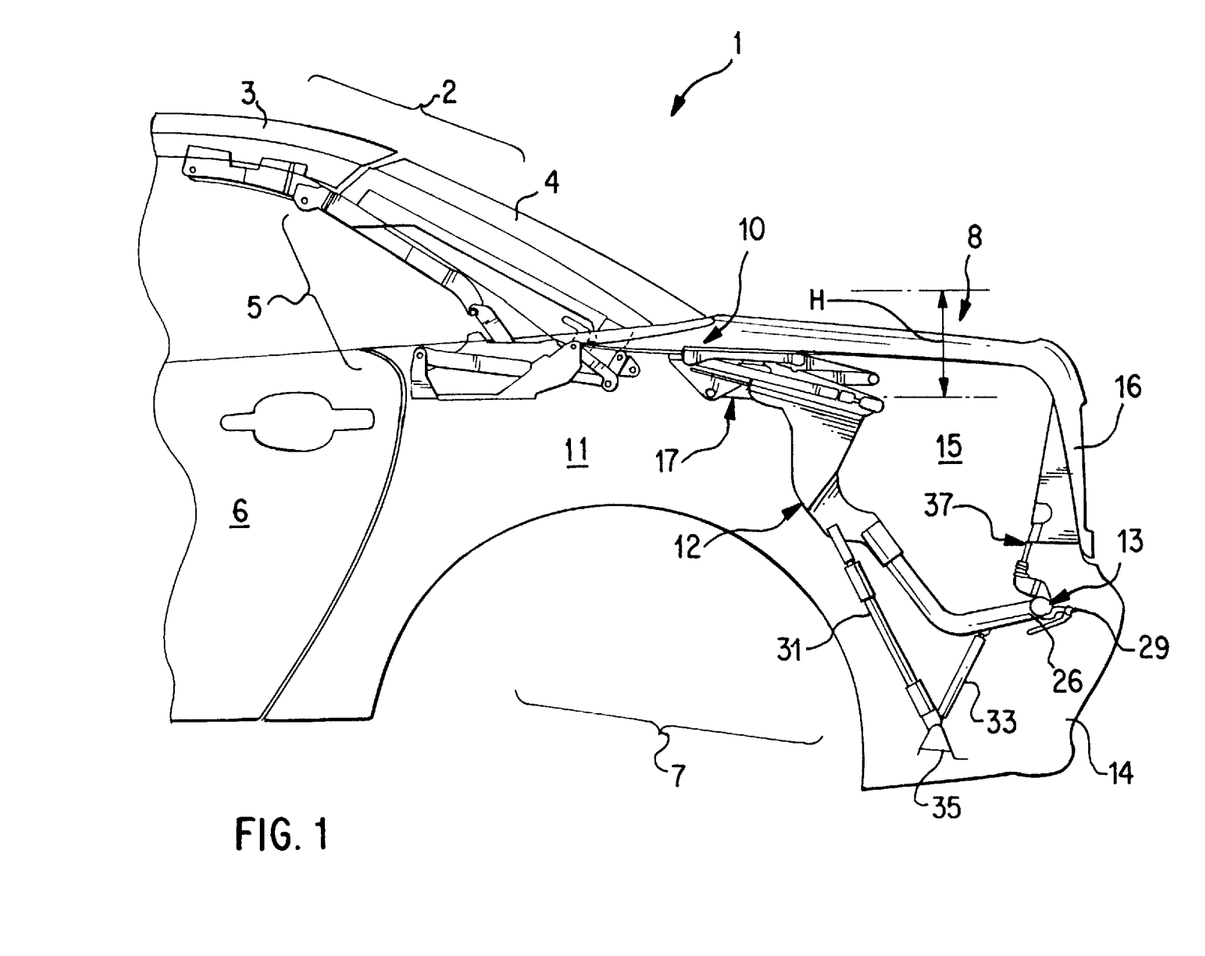
FIG. 1 is a detailed schematic diagram of the tail-end region of the hard-top vehicle according to the present invention, with the tail gate in the closed position.

FIG. 1 represents a hard-top vehicle, designated generally by reference number 1, whose roof structure 2 is designed with a roof part 3 and a rear-window part 4 connected pivotably thereto. In the depicted closed position of the roof structure 2, the roof part 3 bears against a windscreen frame (not shown). The roof structure can be pivoted, via a positive-locking device 5 supported such that it is fixed to the bodywork, from the position in which it covers the rear-passenger-compartment region 6, into an open position, towards the tail-end region 7 of the vehicle 1. Provided in the tail-end region 7 of the vehicle is a pivotably supported tail gate 8. The tail gate 8, after having pivoted in the region of the pivot pin 10 (FIG. 3), releases or opens-up a folding-top compartment 11. The tail gate 8 according to the present invention is articulated, by means of its pivot pin 10, on an auxiliary frame 12 (FIG. 2), and the latter, for its part, is supported, via a pivot pin 13, in the lower vehicle end region 14.

Figure 3:
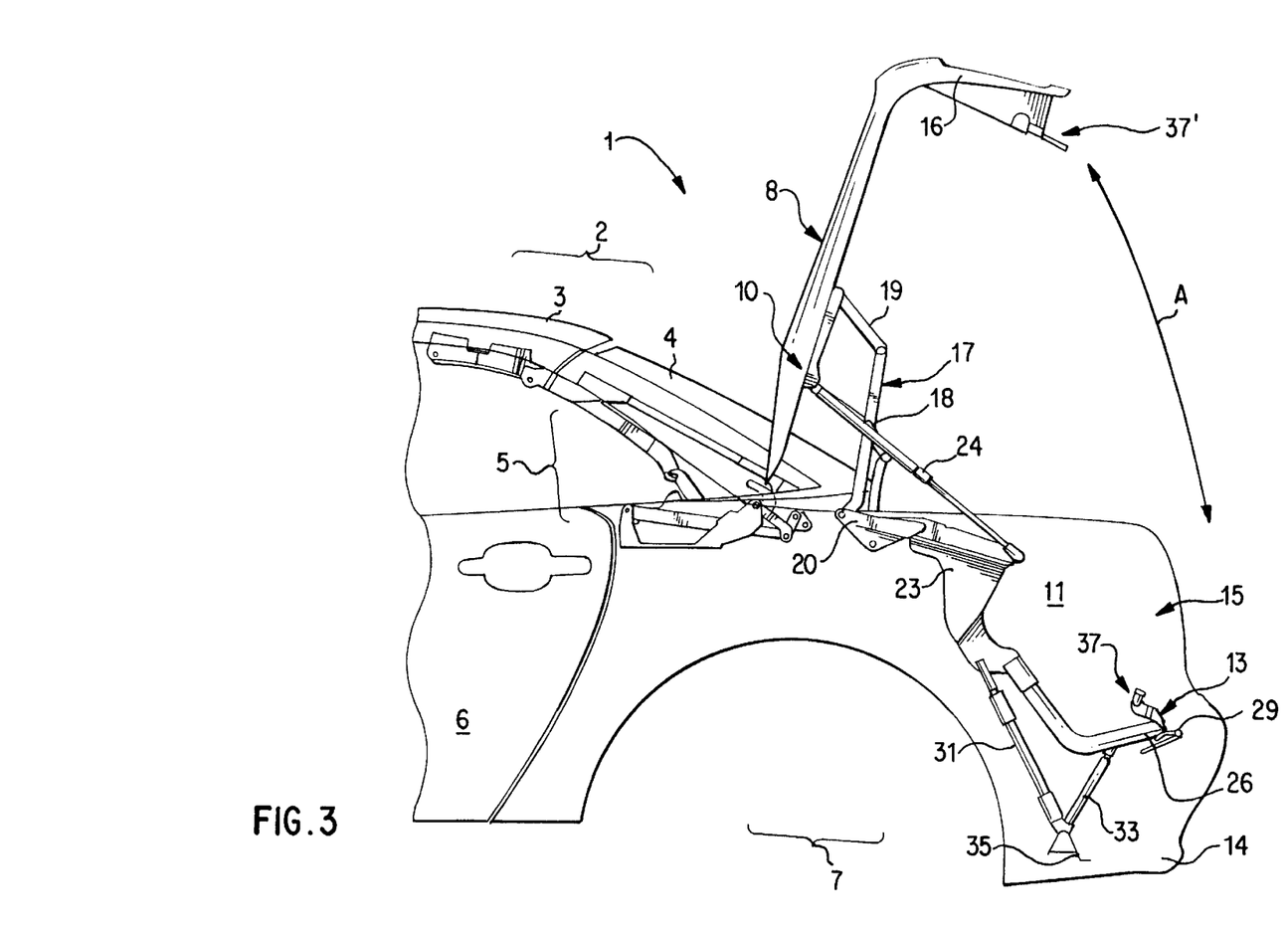
FIG. 3 is a schematic representation similar to FIG. 1, with the tail gate in a first open position.
Figure 5:
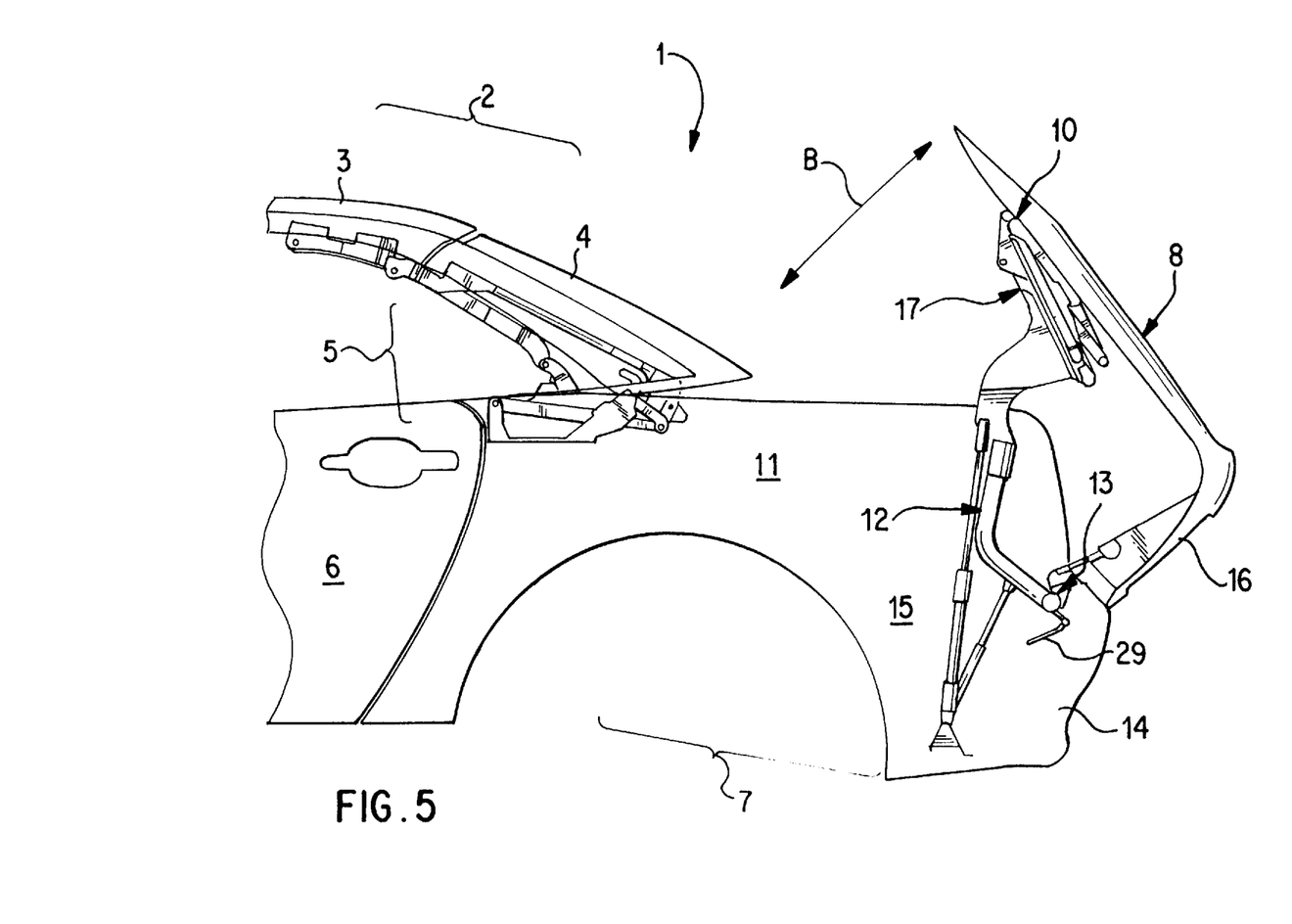
FIG. 5 is a side view similar to FIG. 1, with the tail gate in a second open position.

Together, FIGS. 1, 3 and 5 illustrate that the tail gate 8 can be pivoted, on the one hand, with movement about a pivot pin 10 into a first open position (FIG. 3). In this open position shown in FIG. 3, the tail gate 8 releases the trunk 15 towards the rear. On the other hand, with movement about the second pivot pin 13 together with the auxiliary frame 12. The tail gate is pivoted into a second open position (FIG. 5), in which it essentially releases or exposes the folding-top compartment 11 and the trunk 15 upwards.

With this advantageous component combination of the tail gate 8, designed as a single-piece shaped metal sheet, with the auxiliary frame 12, the tail gate 8 can cover over the entire tail-end region of the hard-top vehicle 1. The tail gate 8 is designed, in particular, with a covering contour which extends, in the closed position, to the rear border region of the rear-window part 4 and covers over both the trunk 15 and, at least in certain areas, the folding-top compartment 11. The tail gate 8 extends, with a contour region 16, into the lower vehicle end region 14.

Figure 2:
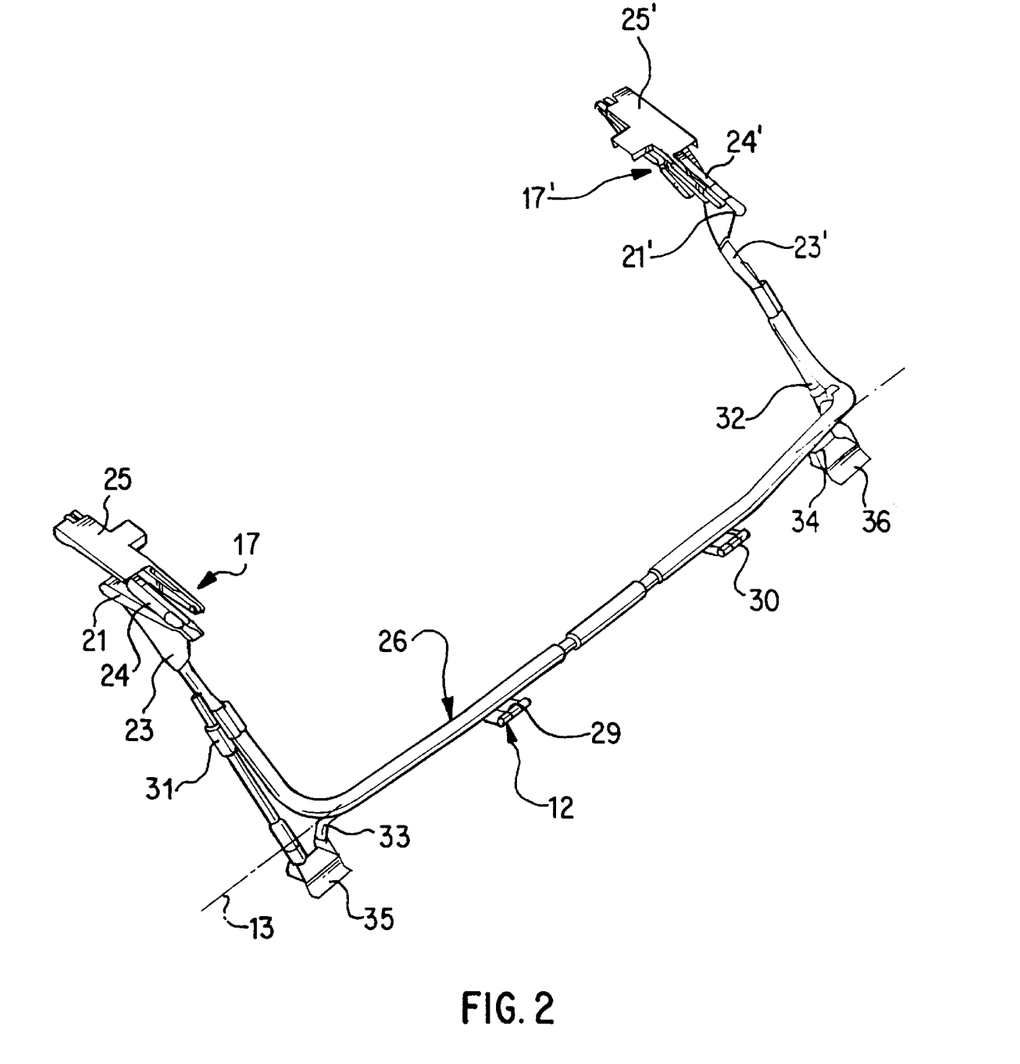
FIG. 2 is a perspective representation of an auxiliary frame which supports the tail gate in the tail-end region of the vehicle.

In the region of its pivot pin 10, the tail gate 8 is connected to the auxiliary frame 12 on both sides, via respective guide linkages 17, 17' (FIG. 1, FIG. 2). As a result, in the first open position, which is illustrated in accordance with FIG. 3 and is usually envisaged for use of the trunk, a large opening angle A can be achieved. In this arrangement, the tail gate 8 is pivoted up to beyond the rear-window part 4 of the roof structure 2.

The two guide linkages, 17, 17' (FIG. 4), located opposite one another in pairs, are each provided with two pivot parallelograms 19, 20 and 19', 20'. The pivot parallelograms each interact in pairs via a common pivot bearing 18, 18' in the manner of a scissors-type lifting link mechanism.

Figure 4:
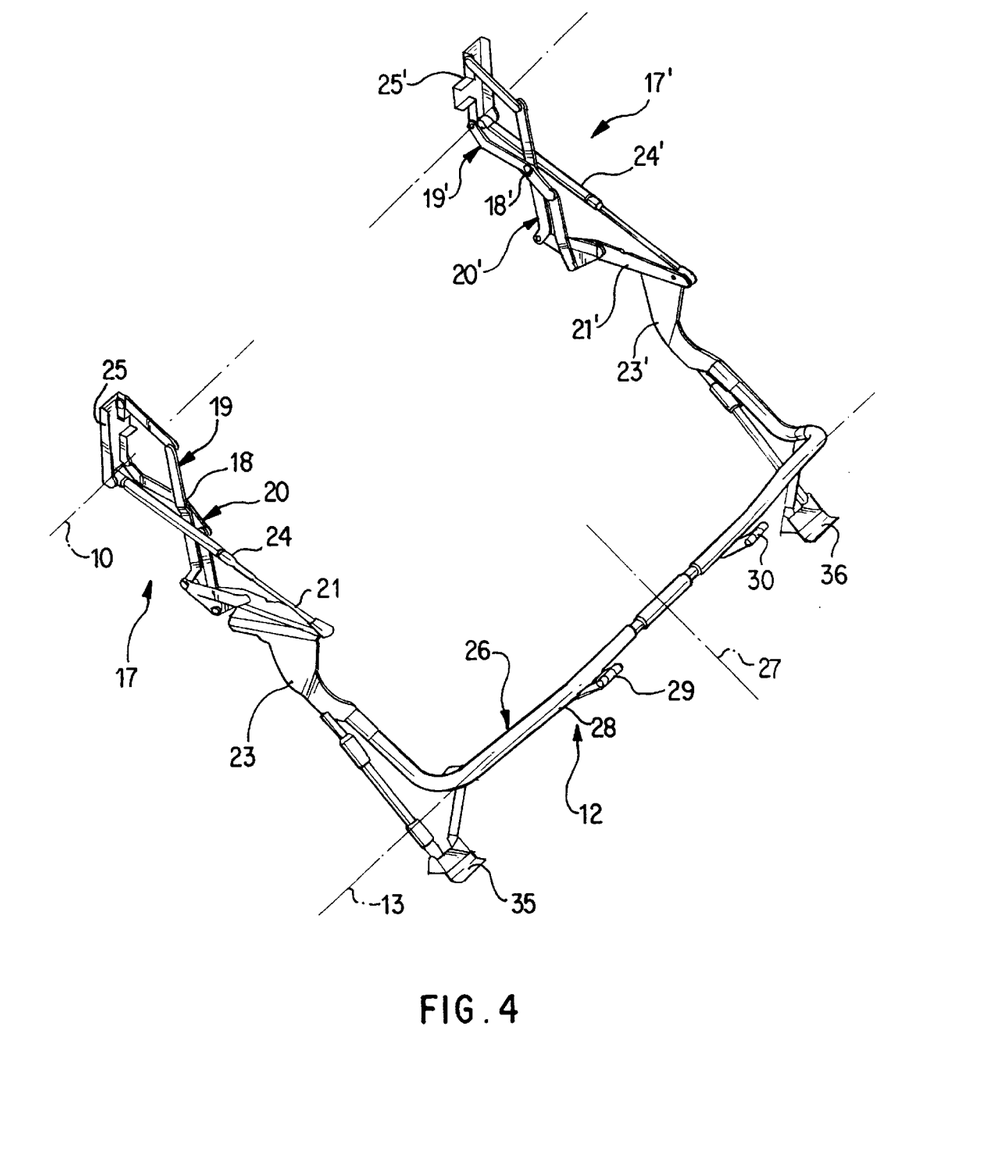
FIG. 4 is a perspective representation of the auxiliary frame located in the first open position according to FIG. 3, the auxiliary frame being illustrated by itself.

In an advantageous design, the pivot parallelogram 20, 20' directed towards the auxiliary frame 12 is connected, via a connecting plate 21, 21', to a supporting leg 23, 23' of the auxiliary frame 12. A gas-filled spring device 24, 24' is supported on the supporting leg 23, 23'. The gas-filled spring device 24, 24' acts on a retaining plate 25, 25' towards the tail gate 8, such that the user is assisted in the respective opening and/or closing movement (FIG. 4).

With the use of the scissors-type lifting link mechanism and the respective pivot parallelogram 19, 19', 20, 20', an essentially vertical lifting movement (arrow H) may be imparted to the tail gate 8 in a first movement phase, as the tail gate 8 is pivoted up from the closed position (FIG. 1). As a result, the tail gate 8 is raised above the top-rim line of the vehicle 1. Thereafter, the tail gate 8 can be pivoted with sufficient freedom of movement, towards the rear-window part 4, into the open position in accordance with FIG. 3, such that contact with parts of the bodywork is ruled out and an advantageously increased open position above the rear-window part 4 is achieved.

Figure 6:
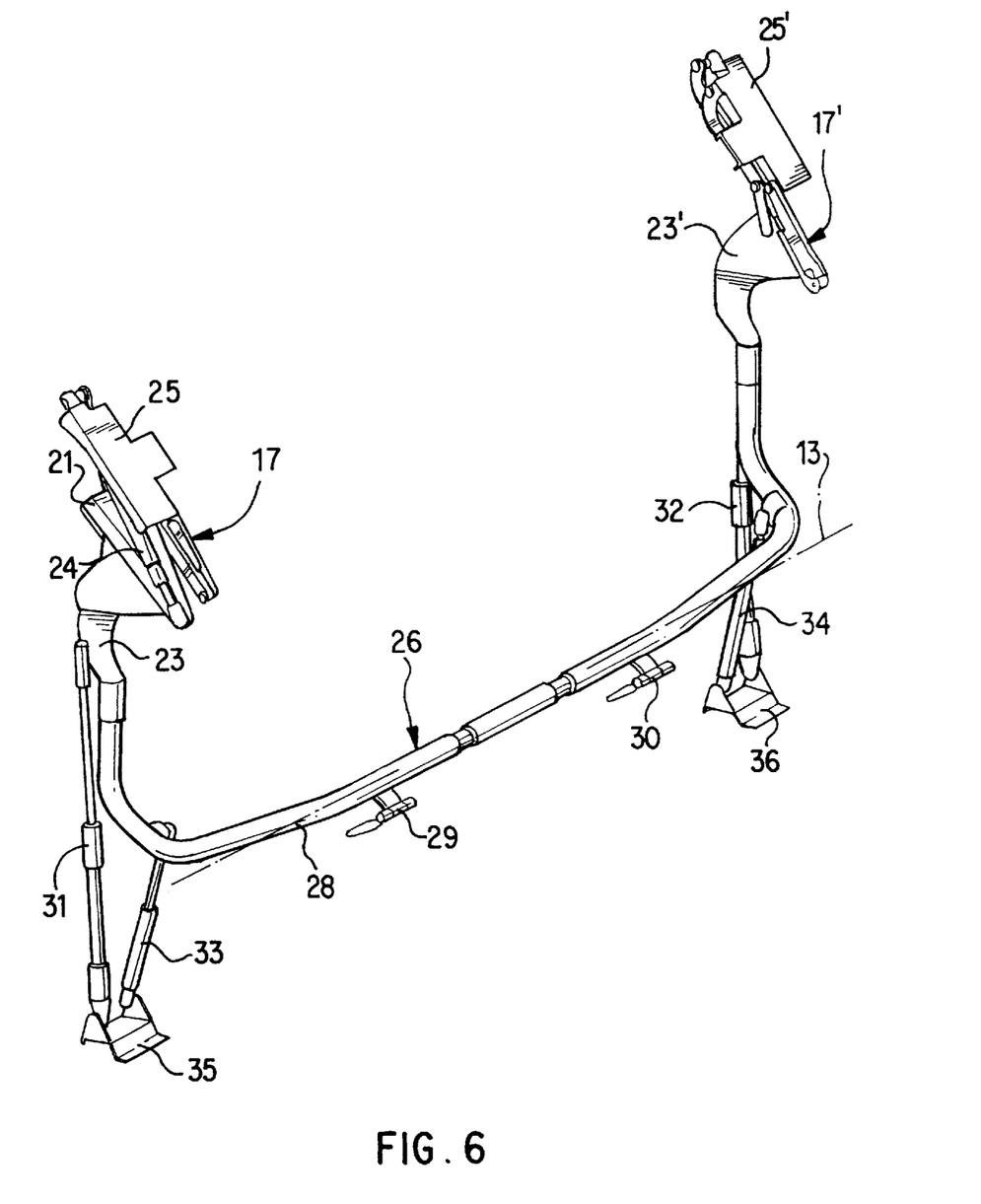
FIG. 6 is a perspective representation of the auxiliary frame located in the second open position according to FIG. 5, the auxiliary frame being illustrated by itself.
Figure 7:
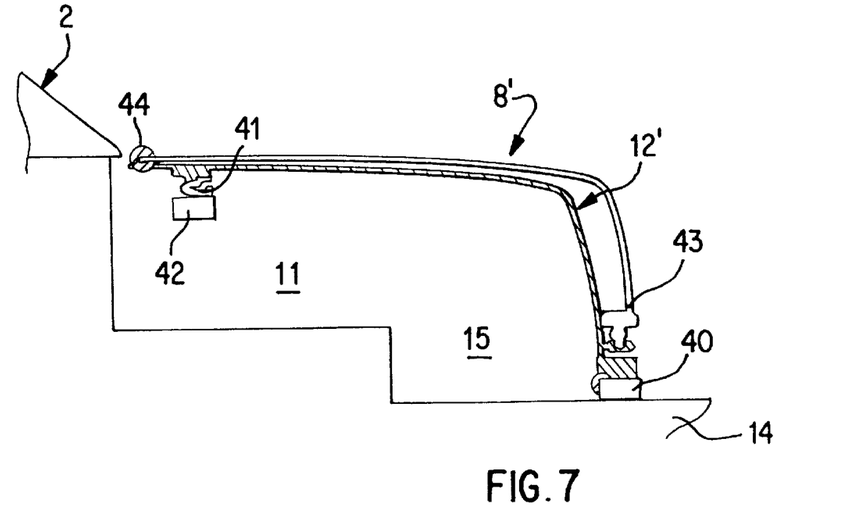
FIG. 7 is a schematic view of a second embodiment of the hard-top vehicle in the tail-end region, with a tail gate with an auxiliary frame.

The schematic representation in accordance with FIG. 6 illustrates, together with FIG. 5, that, in an especially advantageous design, starting from the two upper supporting legs 23, 23', the auxiliary frame 12 is designed with a supporting tube 26 which extends in an essentially U-shaped manner to the lower vehicle region 14. A base leg 28, which runs perpendicularly with respect to the longitudinal axis 27 and defines the pivot axis 13 of the auxiliary frame 12, is supported on both sides on the bodywork via a hinge joint 29, 30 in each case.

For the movement of the auxiliary frame 12 and the tail gate 8 together into the second open position (FIG. 5), the auxiliary frame 12 is provided, in the region of its supporting leg 23, 23', with a hydraulic cylinder 31, 32 in each case (FIG. 6). Via the hydraulic cylinders 31, 32, an automatic opening and closing movement (arrow B) can be initiated. Gas spring devices are provided as additional supporting members in the region of the base leg 28, one in each case in the region of the two U-legs. The hydraulic cylinder 31, 32 and the gas-filled spring device 33, 34 are in each case, in this arrangement, connected to the vehicle bodywork via a common supporting bearing 35, 36 (FIG. 6). During the pivot movement in arrow direction B, the tail gate 8 and the auxiliary frame 12 are fixedly connected to one another in the region of the guide linkage 17, 17' and, at the same time, automatic arresting or stopping takes place in the region of a closing part 37 (FIG. 1). For its part, the closing part 37 is supported on the base leg 28 of the auxiliary frame 12.

Figure 8:
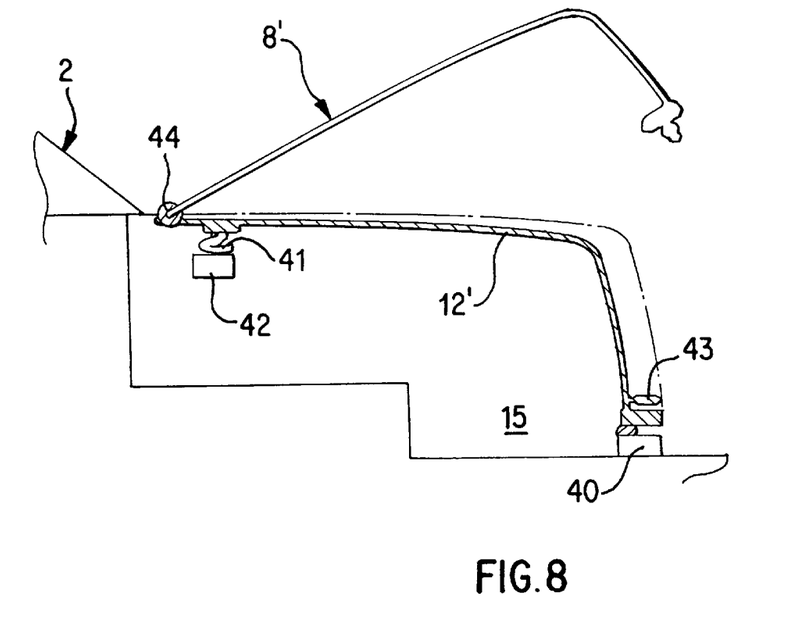
FIG. 8 is a schematic view of the tail gate according to FIG. 7 in a first open position.
Figure 9:
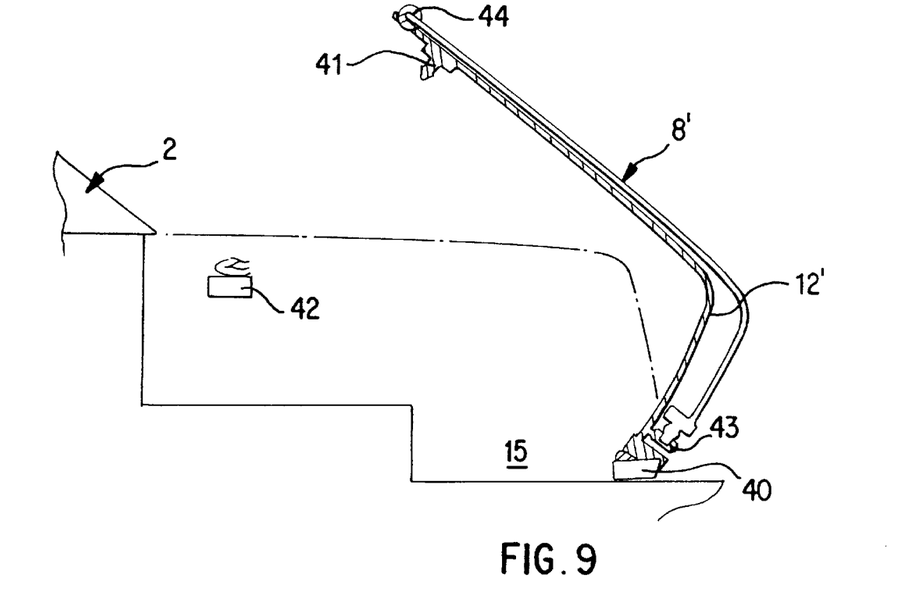
FIG. 9 is a schematic view of the tail gate according to FIG. 7 in a second open position.

Provided in a second embodiment of the tail gate 8' in accordance with FIGS. 7 to 10 is an auxiliary frame 12' which is connected pivotably to the bodywork in the lower vehicle end region 14 via a hinge part 40. In the upper region of the folding-top compartment 11, the auxiliary frame 12' engages, via a connecting member 41, into a receiving part 42 on the bodywork. This is done such that the tail gate 8' can be displaced into the first open position by releasing a lock 43 and pivoting about a joint 44 (FIG. 8).

Figure 10:
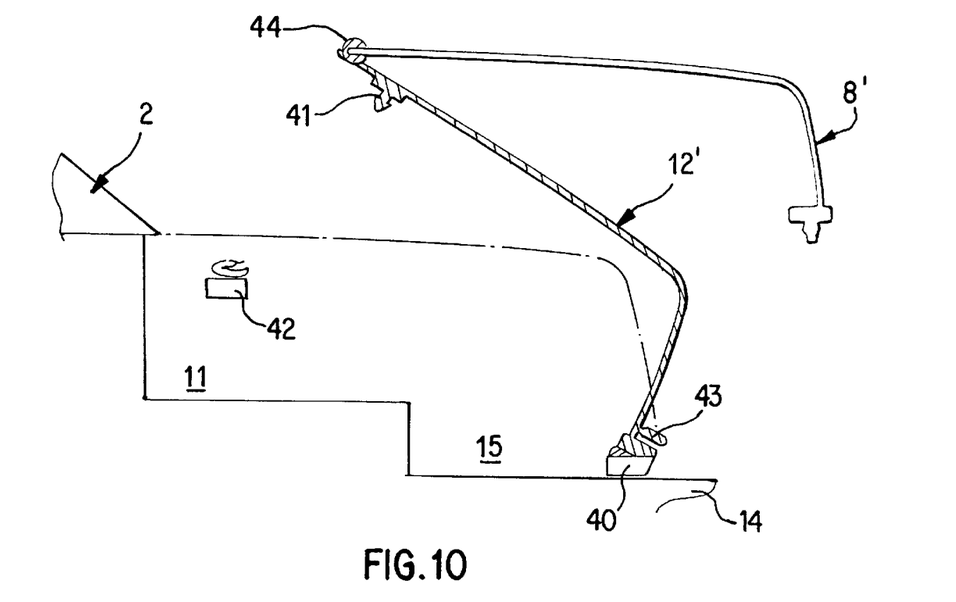
FIG. 10 is a schematic view of the tail gate according to FIG. 7 in an additional pivot position.

For pivoting the tail gate 8' and the auxiliary frame 12' together into the second open position (FIG. 9), for receiving the roof structure 2', the upper connection in the region of the connecting member 41 is released and the two components pivot together about the hinge part 40. The movement phase represented in FIG. 10 illustrates a further possible combination of the open positions in accordance with FIGS. 8 and 9.

Figure 11:
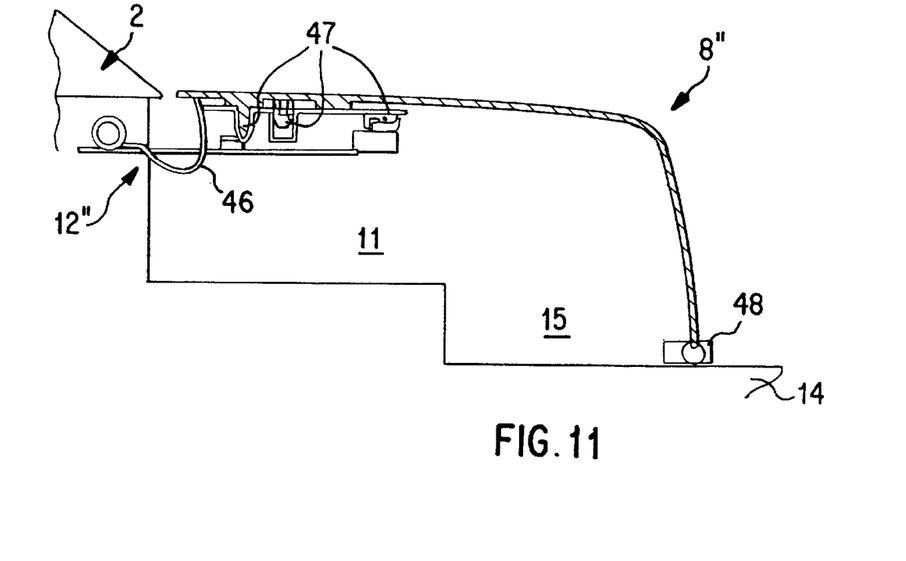
FIG. 11 is a schematic view of a third embodiment of the hard-top vehicle in the tail-gate region, with the tail-gate with an auxiliary frame.
Figure 12:
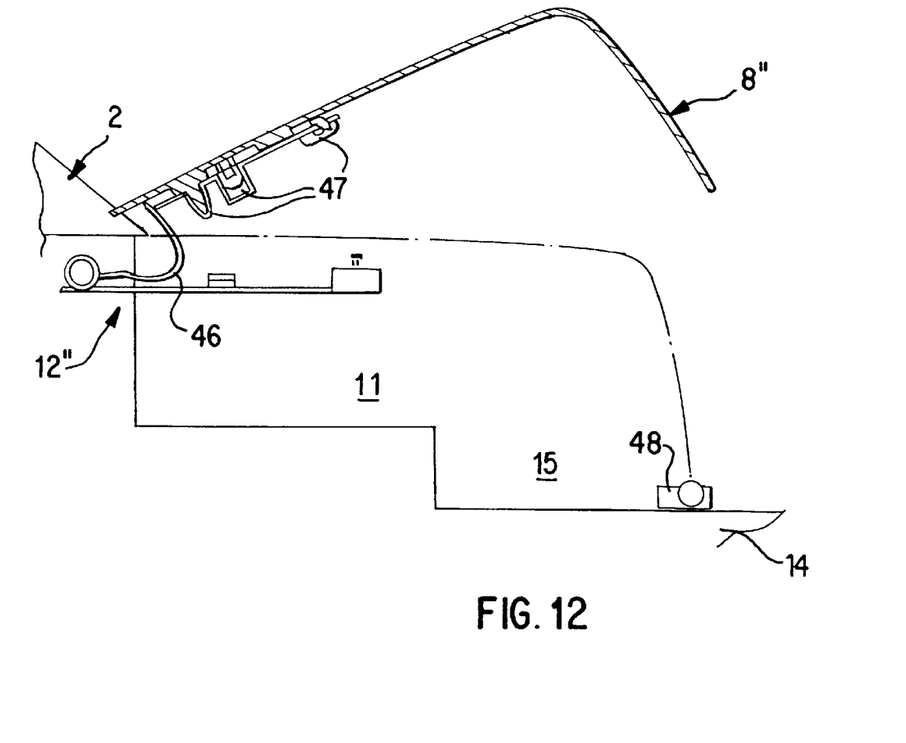
FIG. 12 is a schematic view of the tail gate according FIG. 11 in a first open position.
Figure 13:
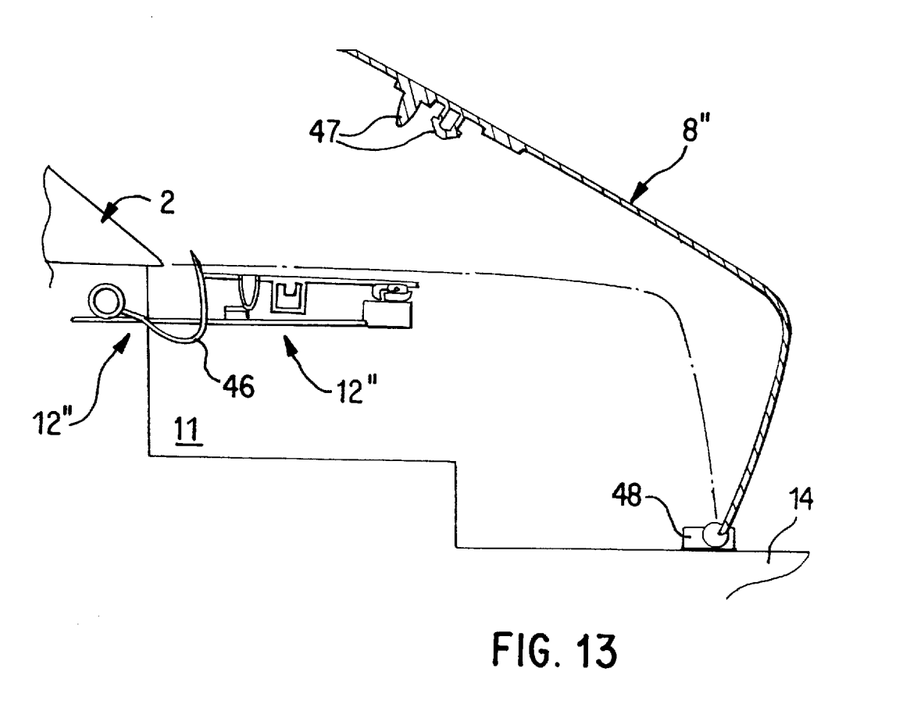
FIG. 13 is a schematic view of the tail gate according to FIG. 11 in a second open position.

In a third embodiment of the tail gate 8" in accordance with FIGS. 11 to 13, the assigned auxiliary frame 12" is shortened to a pivot bracket 46, arranged in the region above the folding-top compartment 11. At the same time, the tail gate 8" is designed as a torsionally rigid component, such that the tail gate, together with the connecting members 47 directed towards the auxiliary frame 12", can be pivoted into the second open position about a joint part 48 located in the lower vehicle end region 14 (FIG. 13). Represented in FIG. 12 is a first movement phase, in which a pivot movement takes place in the region of the pivot (46) such that the folding-top compartment 11 and the trunk 15 are accessible.

The term "hard-top vehicle" has been selected as the collective term for all vehicles with a roof which can be lowered to the full extent. Such vehicles are also designated as cabriolets, convertibles, etc. Accordingly, the roof of the cabriolet or convertible could be a rigid roof as well as a soft top or the like. Alternatively, "folding-roof vehicle" could also be used as the collective term.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A hard-top vehicle having a roof structure including at least one roof part and a rear-window part, the roof structure being pivoted via a positive-control device fixedly supported on a bodywork of the vehicle from a closed position bearing against a front windscreen frame and covering a rear-passenger-compartment region into an open position towards a tail-end region of the vehicle, comprising:
   a tail gate of the vehicle, said tail gate being supported via a pivot pin, the roof structure being lowerable into a folding-top compartment in a region of said tail gate;
   an auxiliary frame on which said tail gate is articulated via its pivot pin, said auxiliary frame being supported via a second pivot pin on the bodywork in a lower vehicle end region;
   wherein said tail gate is pivoted with a first movement about its pivot pin into a first open position opening a trunk towards the rear;
   wherein a forward end of said tail gate is pivoted upwards with a second movement about the second pivot pin together with said auxiliary frame into a second opening position to expose the folding-top compartment and the trunk upwards, and
   wherein the auxiliary frame comprises, beginning from an upper supporting leg, a supporting tube extending in an essentially U-shaped manner in a lower vehicle end region, said supporting tube having a base leg running perpendicularly with respect to a longitudinal axis through said vehicle, said base leg defining a pivot axis for the auxiliary frame and being supported on the bodywork via at least one hinge joint.

2. A hard-top vehicle according to claim 1, wherein said tail gate has a covering contour which extends in the closed position to a rear border region of the rear-window part and covers both the trunk and, at least partially covers the folding-top compartment.

3. A hard-top vehicle according to claim 1, further comprising a guide linkage which connects the tail gate in a region of the pivot pin to the auxiliary frame.

4. A hard-top vehicle according to claim 3, wherein said guide linkage is a scissors-type lifting link mechanism comprising two pivot parallelograms connected in a common pivot bearing.

5. A hard-top vehicle according to claim 4, wherein one of the pivot parallelograms is directed towards the auxiliary frame and is connected via a connecting plate to a supporting leg of the auxiliary frame, and a gas-filled spring device is supported on the supporting leg, said gas-filled spring device interacting with the associated pivot parallelograms.

6. A hard-top vehicle according to claim 1, further comprising a hydraulic cylinder connected to a supporting leg to the auxiliary frame; and
   a gas-filled spring device connected to a supporting tube to the auxiliary frame.

7. A hard-top vehicle according to claim 6, wherein the hydraulic cylinder and the gas-filled spring device are connected to the vehicle bodywork via a common supporting bearing.

8. A pivot mechanism for a tail gate of a foldable hard-top vehicle, comprising:
   a first pivot pin providing an articulation for the tail gate;
   an auxiliary frame on which said tail gate is articulated via said first pivot pin, said auxiliary frame being supported via a second pivot pin on a bodywork in a lower vehicle end region, wherein the auxiliary frame comprises, beginning from an upper supporting leg, a supporting tube extending in an essentially U-shaped manner in the lower vehicle end region, said supporting tube having a base leg running perpendicularly with respect to a longitudinal axis through said vehicle, said base leg defining a pivot axis for the auxiliary frame and being supported on the bodywork via at least one hinge joint;
   wherein a first movement about the first pivot pin in a first direction causes the tail gate to be pivoted into a first open position opening a trunk area towards the rear of the vehicle; and
   wherein a second movement about the second pivot pin in a second direction opposite to the first direction causes the tail gate together with the auxiliary frame to be pivoted into a second opening position in which a compartment for the foldable hard-top and the trunk area is opened in an upward direction.

9. A pivot mechanism according to claim 8, wherein the auxiliary frame is arranged to be stored completely inside the vehicle rearwardly of rear vehicle seats when the trunk area is closed.

10. A pivot mechanism according to claim 8, wherein at least a portion of the auxiliary frame remains within the vehicle during the first and second movements.

11. A pivot mechanism according to claim 8, wherein the tail gate is arranged such that in the second opening position, a folding top of the vehicle is movable into and out of the compartment.

* * * * *